(12) United States Patent
Moon et al.

(10) Patent No.: US 7,457,022 B2
(45) Date of Patent: Nov. 25, 2008

(54) VIBRATION TYPE TILTING DEVICE

(75) Inventors: Yang-Ho Moon, Ansan-si (KR);
Jae-Kyung Kim, Ansan-si (KR);
Kyoung-Shin Park, Suwon-si (KR);
Chil-Sung Lee, Suwon-si (KR)

(73) Assignee: Samsung Electro-Mechanics Co., Ltd., Suwon (KR)

( * ) Notice: Subject to any disclaimer, the term of this patent is extended or adjusted under 35 U.S.C. 154(b) by 61 days.

(21) Appl. No.: 11/514,306

(22) Filed: Sep. 1, 2006

(65) Prior Publication Data
US 2007/0127146 A1    Jun. 7, 2007

(30) Foreign Application Priority Data
Sep. 1, 2005    (KR)    .................. 10-2005-0081338

(51) Int. Cl.
*G02B 26/08* (2006.01)
(52) U.S. Cl. .................................. 359/223; 359/198

(58) Field of Classification Search ......... 359/223–226, 359/291, 871, 872, 290
See application file for complete search history.

(56) References Cited

U.S. PATENT DOCUMENTS 5,276,545 A * 1/1994 Daun et al. .................. 359/198
6,254,242 B1 * 7/2001 Henion et al. ............... 359/872

* cited by examiner

*Primary Examiner*—Euncha P Cherry

(57) ABSTRACT

A vibration type tilting device, according to an embodiment of the invention, which comprises a mirror holder, supporting a mirror on one side, which tilts together with the mirror such that the mirror periodically tilts light on a light path in a minute angle; a holder support part supporting the mirror holder; a driving part, which supplies driving power to the mirror holder; and a damping part positioned between the mirror holder and the holder support part to reduce overshoot of the mirror holder, can improve the vibration performance of the tilting device to provide a smoother and clearer picture quality.

9 Claims, 12 Drawing Sheets

VIBRATION TYPE TILTING DEVICE

CROSS-REFERENCE TO RELATED APPLICATIONS

This application claims the benefit of Korean Patent Application No. 2005-0081338 filed with the Korean Intellectual Property Office on Sep. 1, 2005, the disclosure of which is incorporated herein by reference in its entirety.

BACKGROUND

1. Technical Field

The present invention relates to a vibration type tilting device which is positioned on a light path and which periodically performs tilting to reflect light emitted from a light source.

2. Description of the Related Art

A vibration type tilting device, often used in projection TV's, etc., is positioned on a light path and periodically tilts the light projected to a screen in minute angles to create a visual afterimage effect and provide a more natural picture.

FIG. 1 is a perspective cross-sectional view of a conventional vibration type tilting device, and FIG. 2 is a cross-sectional view of the conventional vibration type tilting device illustrated in FIG. 1. The vibration type tilting device depicted in FIGS. 1 and 2 includes a mirror 1 which reflects light emitted from a light source (not shown), a mirror holder 2 supporting the mirror 1, coils 3 attached on the reverse side of the mirror holder 2 in bilateral symmetry, cores 5 inserted inside the coils 3, and magnets 7 and yokes 9 positioned at the upper portions of the cores 5. Also, viscous fluid 6 is inserted between the coil 3 and the yoke 9 and between the coil 3 and the core 5.

When an electric current is supplied to the coils, an electric field is formed, where the interaction between this electric field and the magnetic field generated by the magnets 7 generates a vibrational force which tilts the mirror holder 2. The viscous fluid 6 performs damping on the vibrating coils 3 to improve the vibration performance of the mirror holder 2, e.g. by reducing rising time or overshoot.

FIG. 3 is a graph representing the temperatures of the mirror holder 2 and coils 3 during operation of a conventional vibration type tilting device.

As illustrated in FIG. 3, in a conventional vibration type tilting device, the temperature in the vicinity of the coils 3 rises to a high level of about 125° C., due to the electric current supplied to the coils 3. In particular, as the resistance of the coils 3 increases further with prolonged use of the tilting device, the concentration of heat in the vicinity of the coils 3 is further exacerbated. This rise in temperature of the coils 3, as illustrated in FIG. 2, increases the temperature of the viscous fluid 6 in the vicinity of the coils 3 and lowers the viscosity. It is noted, however, that the parts other than the coils 3 are close to normal temperature (20° C.).

FIG. 4(a) is a graph representing the vibration characteristics of a tilting device at normal temperature, and FIG. 4(b) is a graph representing the vibration characteristics of a tilting device kept for 1 hour at 80° C. In the graphs, the vertical axis represents the displacement of the mirror holder 2. As illustrated in FIG. 4(a), a conventional vibration type tilting device shows a 5.2% overshoot at room temperature, but shows a 17.3% overshoot when the temperature is increased. This increase in overshoot following a rise in temperature is because the higher the temperature of a fluid, the lower its viscosity.

Thus, in a conventional vibration type tilting device, the temperature of the viscous fluid 6 is increased with prolonged use, due to the rise in temperature of the coils 3, whereby the viscosity of the viscous fluid is decreased, and the vibration performance of the mirror holder 2, such as that represented by overshoot, is degraded.

SUMMARY

The present invention aims to resolve the problem set forth above, and it is thus an objective of the invention to provide a vibration type tilting device which can improve vibration performance to provide a smoother and more natural picture quality.

One aspect of the present invention provides a vibration type tilting device comprising a mirror holder, supporting a mirror on one side, which tilts together with the mirror such that the mirror periodically tilts light on a light path in a minute angle; a holder support part supporting the mirror holder; a driving part, which supplies driving power to the mirror holder; and a damping part positioned between the mirror holder and the holder support part to reduce overshoot of the mirror holder.

The damping part may comprise a fluid insertion groove formed on any one of the mirror holder and the holder support part, a protrusion part formed on the other of the mirror holder and the holder support part and held in the fluid insertion groove, and viscous fluid placed between the fluid insertion groove and the protrusion part. The damping part may be separated by a particular gap from the driving part. It may be preferable that the protrusion part be arranged in bilateral symmetry with respect to the vibration direction of the mirror holder.

The driving part may comprise a coil joined to the bottom surface of the mirror holder; and a magnet, secured to the holder support part, which generates a magnetic field passing through the coil. The driving part may further comprise a core, in contact with the magnet, of which a portion is positioned inside the coil. The driving part may also further comprise a yoke positioned on the magnet and surrounding the exterior of the coil.

The mirror holder may be equipped with an incision part having a predetermined size, and a vibration arm formed in the incision part and supporting the mirror holder to allow vibration, with the vibration arm joined to the holder support part. The vibration arm may have the shape of a "T" and may have one or more arm securing holes on either end, and the holder support part may have one or more support part securing grooves formed in positions corresponding to the arm securing holes.

The viscous fluid may be one selected from a group consisting of grease, glycerin, UV-setting silicone, castor oil, SAE 30 oil, SAE 10W-30 oil, and SAE 10W oil.

Additional aspects and advantages of the present invention will be set forth in part in the description which follows, and in part will be obvious from the description, or may be learned by practice of the invention.

DETAILED DESCRIPTION

Embodiments of the invention will be described below in more detail with reference to the accompanying drawings. In the description with reference to the accompanying drawings, those components are rendered the same reference number that are the same or are in correspondence, regardless of the figure number, and redundant explanations are omitted.

Figure 9:
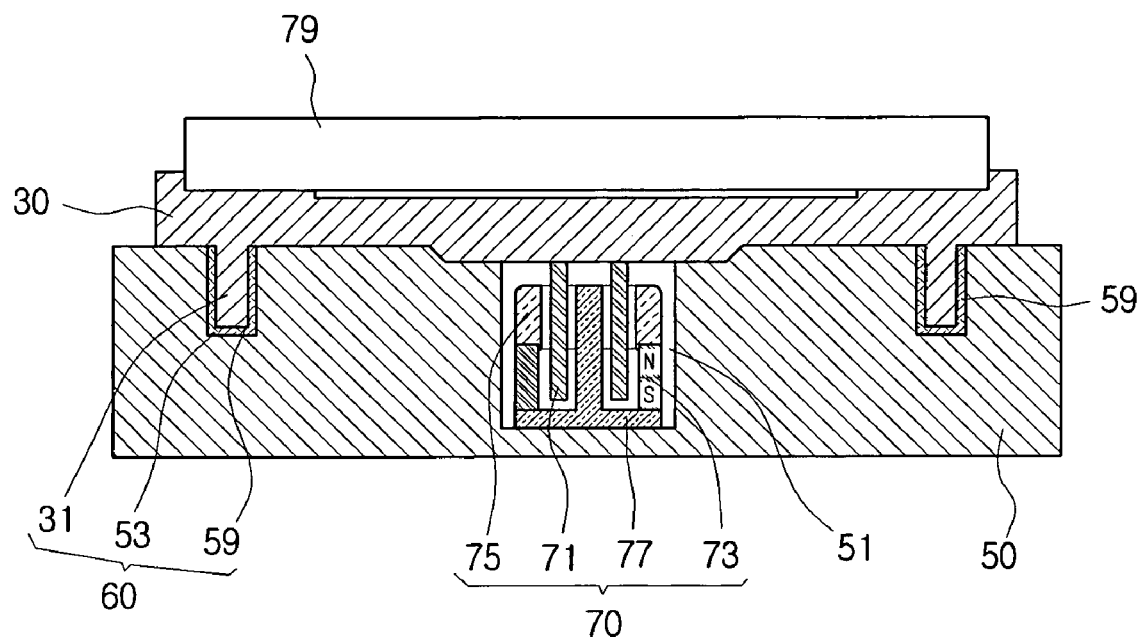
FIG. 9 is a cross-sectional view illustrating the cross section of the mirror holder illustrated in FIG. 5 across line A-A' and the cross section of the holder support part illustrated in FIG. 7 across line B-B' assembled together.

The vibration type tilting device according to an embodiment of the invention includes, as illustrated in FIG. 9, a mirror holder 30 supporting a mirror 79, a holder support part 50 supporting the mirror holder 30, a driving part 70 which supplies driving power to the holder support part 50 and which comprises a coil 71, magnet 73, yoke 75, and core 77, and a damping part 60 which provides damping forces on the mirror holder 30.

Figure 5:
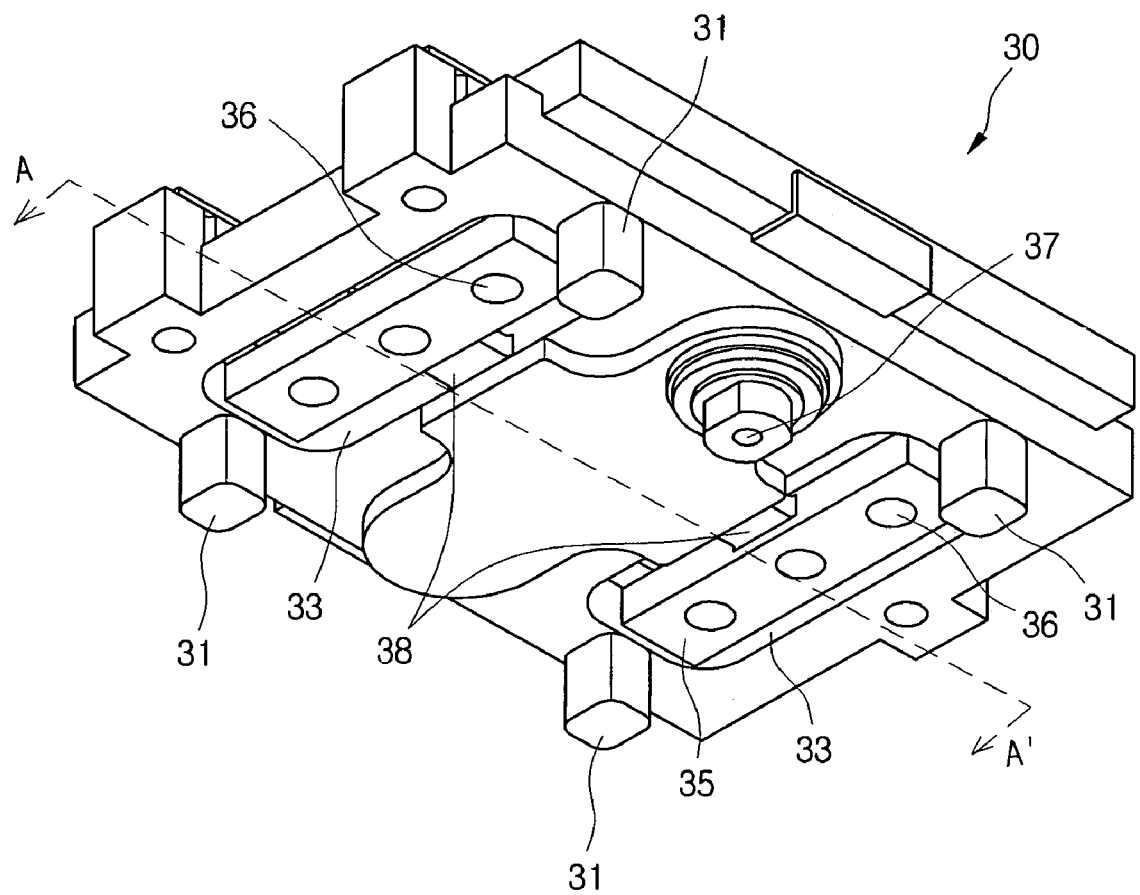
FIG. 5 is a perspective view illustrating the bottom surface of a mirror holder according to an embodiment of the invention.
Figure 6:
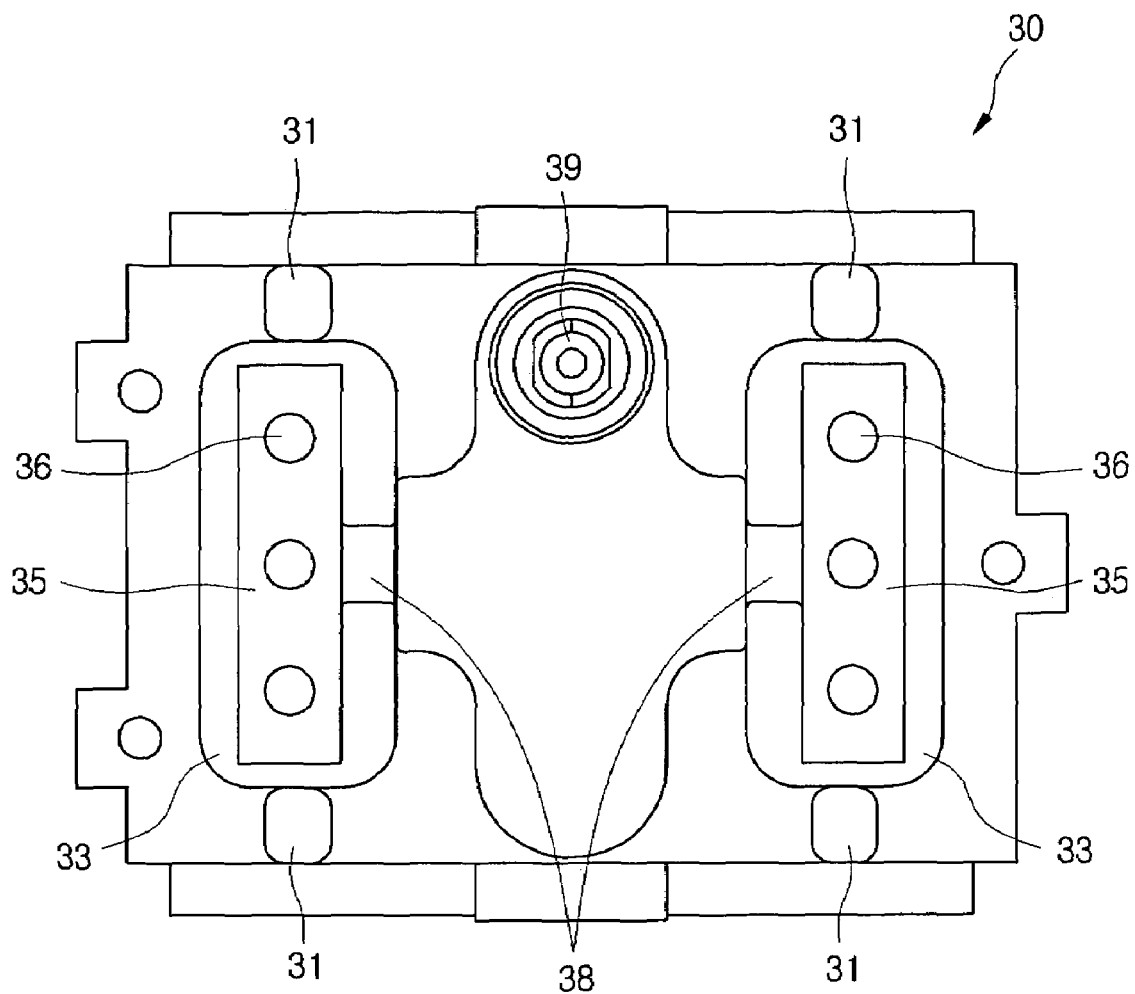
FIG. 6 is a bottom view of a mirror holder according to an embodiment of the invention.

FIG. 5 is a perspective view illustrating the bottom surface of a mirror holder 30 according to an embodiment of the invention, and FIG. 6 is a bottom view of the mirror holder 30 illustrated in FIG. 5.

A mirror (not shown) is joined to the upper surface of the mirror holder 30 illustrated in FIG. 5, and on the respective corners of the bottom surface, there are protrusion parts 31 formed symmetrically. On one side of the center is a coil securing part 37 to which the coil (not shown) is joined, while on each side of the coil securing part 37 is formed an incision part 33. Inside each of the incision parts 33 is formed a vibration arm 35, which joins with the holder support part 50 illustrated in FIG. 7 and which supports the mirror holder 30 in such a manner that allows vibration.

The mirror holder 30 is vibrated by means of a voice coil motor, step motor, or piezoelectric motor, etc., in a frequency of about 60 Hz. Thus, the mirror joined to the upper surface of the mirror holder 30 periodically tilts light to create a visual afterimage effect, so that a smoother and more natural picture is provided. It is preferable that that the mirror holder 30 be generally made of a light and strong material, such as PPS.

A coil 71 (see FIG. 9) is joined to the coil securing part 37 formed on the bottom surface of the mirror holder 30. The coil securing part 37 becomes the point of application of the electromagnetic force generated by the coil. While there is one coil securing part 37 formed on the reverse side of the mirror holder 30 in FIG. 5, the present invention is not thus limited, and various configurations may be used according to the vibration performance of the tilting device or to the operating environment. For example, two or four symmetrically arranged coil securing parts 37 may be used.

The incision parts 33 are incised in the mirror holder 30 in bilateral symmetry, with the vibration arms 35 positioned inside. The incision parts 33 allow the mirror holder 30 to vibrate while it is supported by the vibration arms 35. The vibration arm 35 has the shape of a "T", and is joined with the mirror holder 30 by means of a cantilever 38. The mirror holder 30 is made to vibrate about these cantilevers 38. The vibration arm 35 includes arm securing holes 36. Screws (not shown) are inserted through the arm securing holes 36 and the support part securing grooves 57 illustrated in FIG. 7, whereby the mirror holder 30 is secured to the holder support part 50.

The protrusion part 31, together with the fluid insertion groove 53 and the viscous fluid 59, forms the damping part 60. The protrusion parts 31 are formed on the bottom surface of the mirror holder 30 symmetrically in each of the corner portions. While the protrusion part 31 is shown to have a cylindrical shape, a variety of shapes may be used as necessary, such as shapes with elliptical or polygonal cross sections. The protrusion parts 31 are positioned inside the fluid insertion grooves 53 of the holder support part 50 illustrated in FIG. 7. As illustrated in FIG. 9, viscous fluid 59 is inserted into the fluid insertion grooves 53, and when the mirror holder 30 is vibrated, the protrusion parts 31 are also vibrated, to which damping is applied by the viscous fluid 59. The degree of damping on the protrusion parts 31 by the viscous fluid 59 can be controlled by controlling the cross-sectional areas or lengths of the protrusion parts 31.

Thus, since the viscous fluid 59 is positioned at the protrusion parts 31 and the fluid insertion grooves 53, which are separated from the coil securing part 37 where a large amount of heat is concentrated, embodiments of the invention can prevent the decreasing of viscosity in the viscous fluid 59 due to high temperatures.

Figure 7:
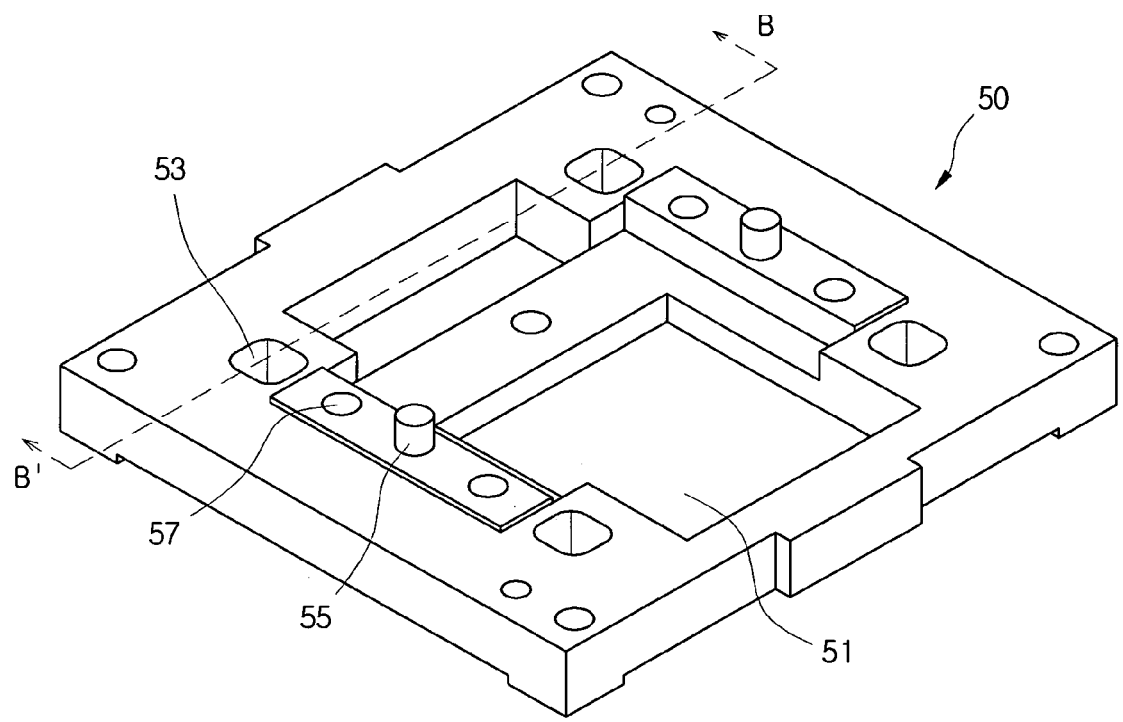
FIG. 7 is a perspective view of a holder support part according to an embodiment of the invention.
Figure 8:
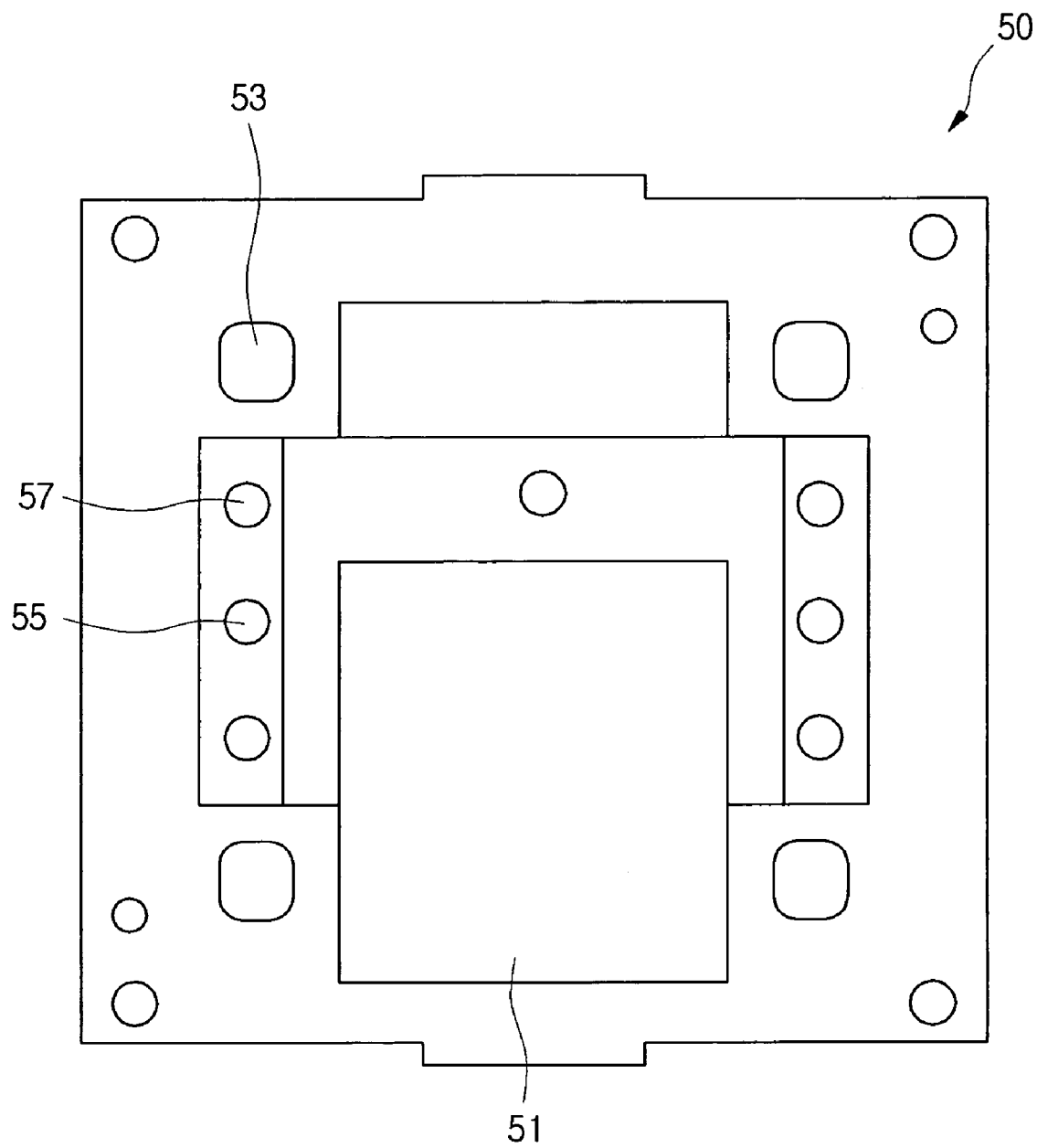
FIG. 8 is a plan view of a holder support part according to an embodiment of the invention.

FIG. 7 is a perspective view of a holder support part 50 according to an embodiment of the invention, and FIG. 8 is a plan view of the holder support part 50 illustrated in FIG. 7.

The holder support part 50 illustrated in FIGS. 7 and 8 has a holding part 51, in which is positioned the driving part for supplying vibrational force to the mirror holder 30, and on one side has fluid insertion holes 53, in which are positioned the viscous fluid 59 and the protrusion parts 31. The holder support part 50 joins with the vibration arm 35 of the mirror holder 30 and supports the mirror holder 30 in such a manner that allows vibration.

The holding part 51 is a groove formed in the center of the holder support part 50 in a predetermined size, and as illustrated in FIG. 9, holds the driving part 70, which comprises the coil 71, magnet 73, core 77, and yoke 75.

On either side of the holding part 51, there are formed support part securing grooves 57, in positions corresponding to the arm securing holes 36 of the vibration arm 35. Screws (not shown) are inserted through the support part securing grooves 57 and the arm securing holes 36, which secure the mirror holder 30 to the holder support part 50. Between the support part securing grooves 57, securing protrusions 55 are formed symmetrically, and the securing protrusions 55 are inserted in the arm securing holes 36 formed in the center.

The fluid insertion groove 53, together with the viscous fluid 59 and the protrusion part 31, forms the damping part 60. The fluid insertion grooves 53 are grooves formed in positions corresponding to the protrusion parts 31 of the mirror holder 30, and the viscous fluid 59 and the protrusion parts 31 are positioned in the fluid insertion grooves 53. The cross section of the fluid insertion groove 53 may be changed as necessary to a circle, ellipse, or polygon, etc. Also, by controlling the gap between the fluid insertion groove 53 and the protrusion part 31, the quantity of the viscous fluid 59 inserted may be controlled.

While the protrusion parts 31 are formed on the mirror holder 30 and the fluid insertion holes 53 are formed on the holder support part 50 in this embodiment, the present invention is not thus limited, and the protrusion parts 31 may protrude from the holder support part 50 in a direction facing the mirror holder 30, while the fluid insertion holes 53 may be formed on the bottom surface of the mirror holder 30.

The viscous fluid 59 may be of any kind, as long as it is capable of providing damping forces on the protrusion parts 31. Also, it is preferable to use a fluid that does not easily evaporate or leak when being inserted. Possible examples of the viscous fluid 59 include grease, glycerin, UV-setting silicone liquid, castor oil, SAE 30 oil, SAE 10W-30 oil, and SAE 10W oil, etc.

For grease, a consistency of about 265 to 475 is preferable (as specified by the National Lubricating Grease Institute). For the base oil, silicone oil or PAO, etc., is preferable, of which the change in consistency is not great at high temperatures. For the thickener, lithium, silica gel, or PTFE (polytetrafluoroethylene, commonly known as "Teflon"), etc. may be used.

UV-setting silicon has a very high viscosity of 87,000 mPas (error range ±10,000) and is very stable, as there is virtually no change in viscosity in the temperature range of −40 to 80° C. Also, excellent damping may be effected with only a small amount.

Since the viscosity coefficient $\mu$ is 1.494 (kg/ms) at 20° C. for glycerin and $\mu=1$ for castor oil, sufficient damping forces may be transferred to the protrusion parts 31.

Also, since SAE 30 oil, for which $\mu=0.43$, SAE 10W-30 oil, for which $\mu=0.17$, and SAE 10W oil, for which $\mu=0.1$, have much higher viscosity coefficients compared to water ($\mu=0.001$), damping forces may efficiently be transferred to the protrusion parts 31.

FIG. 9 shows the cross section of the mirror holder 30 illustrated in FIG. 5 across line A-A' and the cross section of the holder support part 50 illustrated in FIG. 7 across line B-B', as well as the cross sections of the damping parts 60 and the driving part 70.

The mirror 79 is attached to the upper surface of the mirror holder 30 to reflect light. The protrusion parts 31 formed on the reverse side of the mirror holder 30 are positioned inside the fluid insertion grooves 53, and when vibrated, receive damping forces due to the viscous fluid 59 inserted in the fluid insertion grooves 53. There is a holding part 51 equipped in the center of the holder support part 50, and inside the holding part 51 is positioned a vibration part 70 comprising a coil 71, magnet 73, yoke 75, and core 77.

In the center of the mirror holder 30, the coil 71 is attached to the coil securing part 37. The yoke 75 and magnet 73 surround the perimeter of the coil 71. The core 77 is positioned inside the coil 71, and the core 77 is also in contact with the magnet 73.

When an electric current is supplied to the coil 71, an electric field is formed, where the electric field interacts with the magnetic field generated by the magnet 73 to transfer an electromagnetic force to the coil 71. The core 77 is magnetized by the magnet 73 to an N- or S-pole, while the yoke is magnetized to the opposite of the pole of the core 77, so that the magnetic field generated by the magnet 73 is concentrated on the coil 71. This increases the vibrational force of the driving part.

Figure 10A:
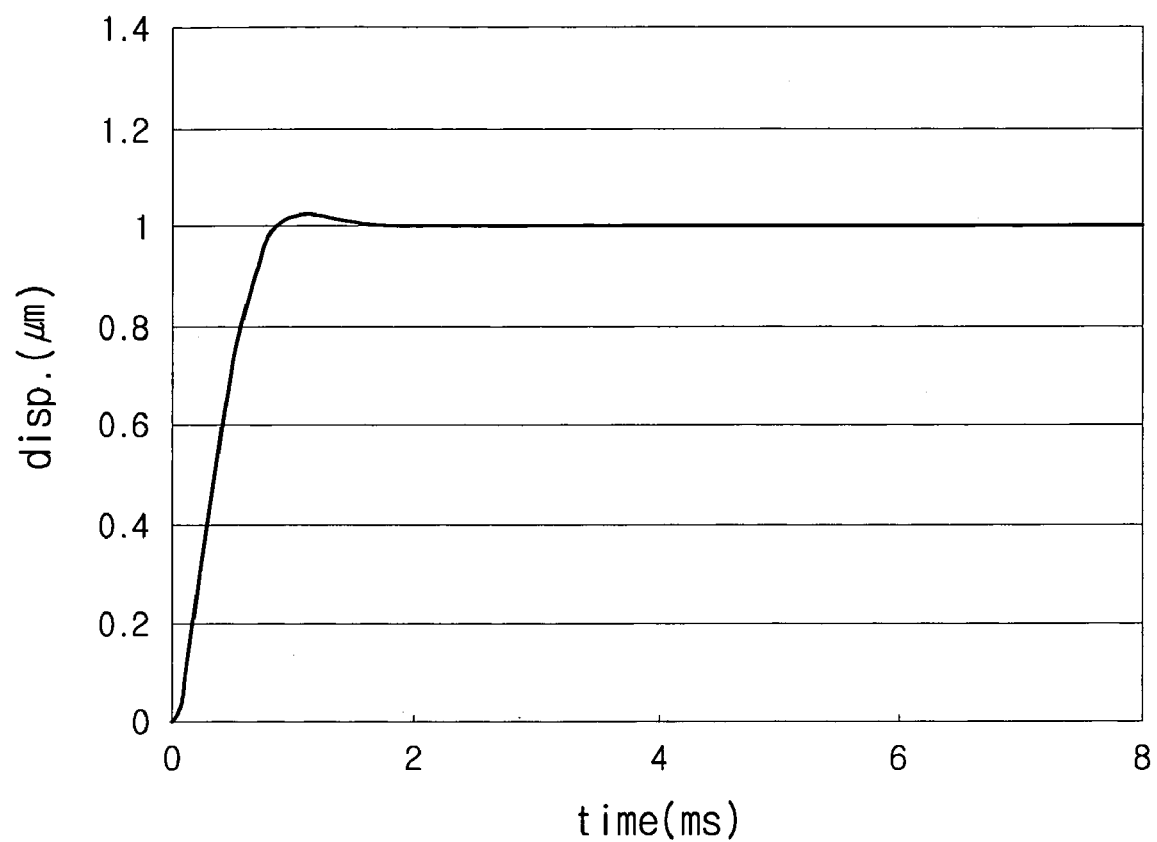
FIG. 10(a) is a graph representing the vibration characteristics of a tilting device according to an embodiment of the invention at normal temperature.
Figure 10B:
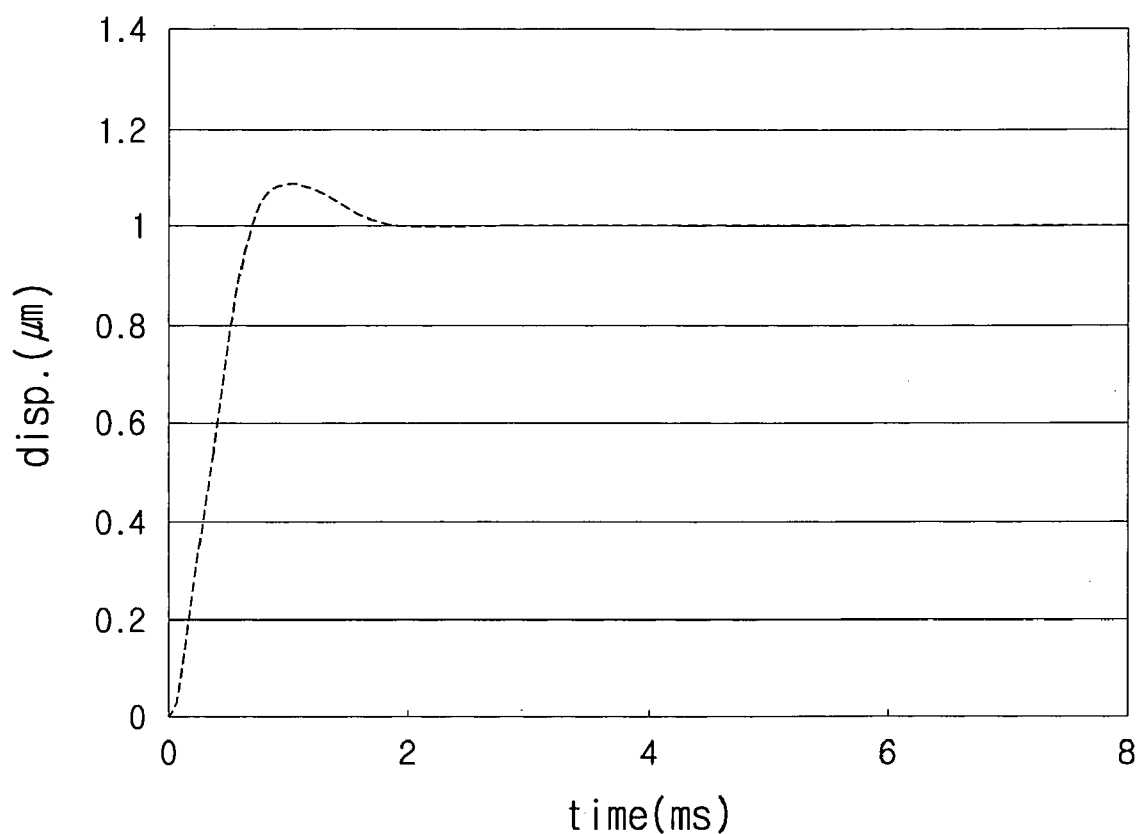
FIG. 10(b) is a graph representing the vibration characteristics of a tilting device according to an embodiment of the invention kept for 1 hour at 80° C.

FIG. 10(a) is a graph representing the vibration characteristics of a tilting device according to an embodiment of the invention at normal temperature, and FIG. 10(b) is a graph representing the vibration characteristics of a tilting device according to an embodiment of the invention kept for 1 hour at 80° C.

Figure 1:
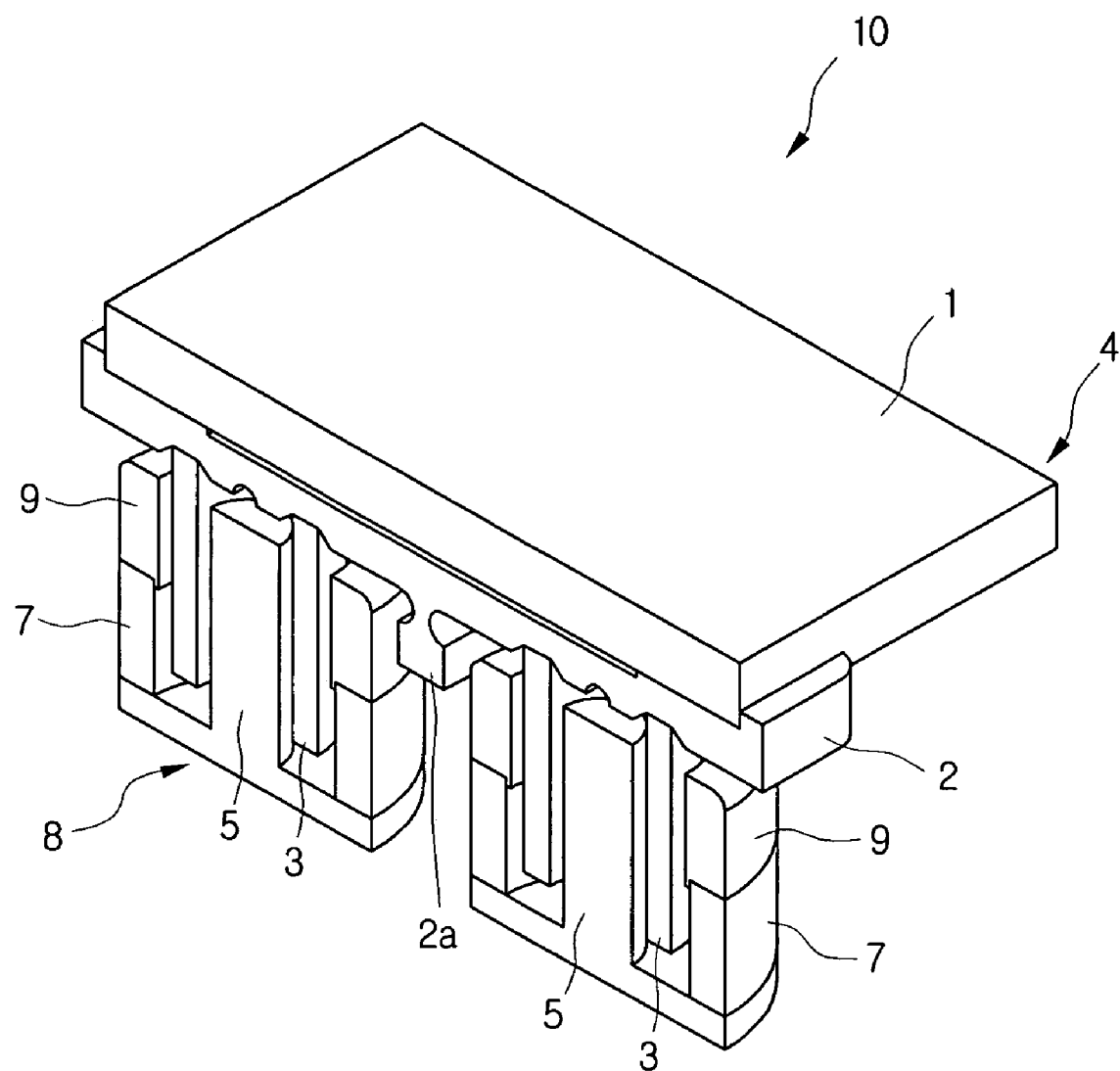
FIG. 1 is a perspective cross-sectional view of a conventional vibration type tilting device.
Figure 2:
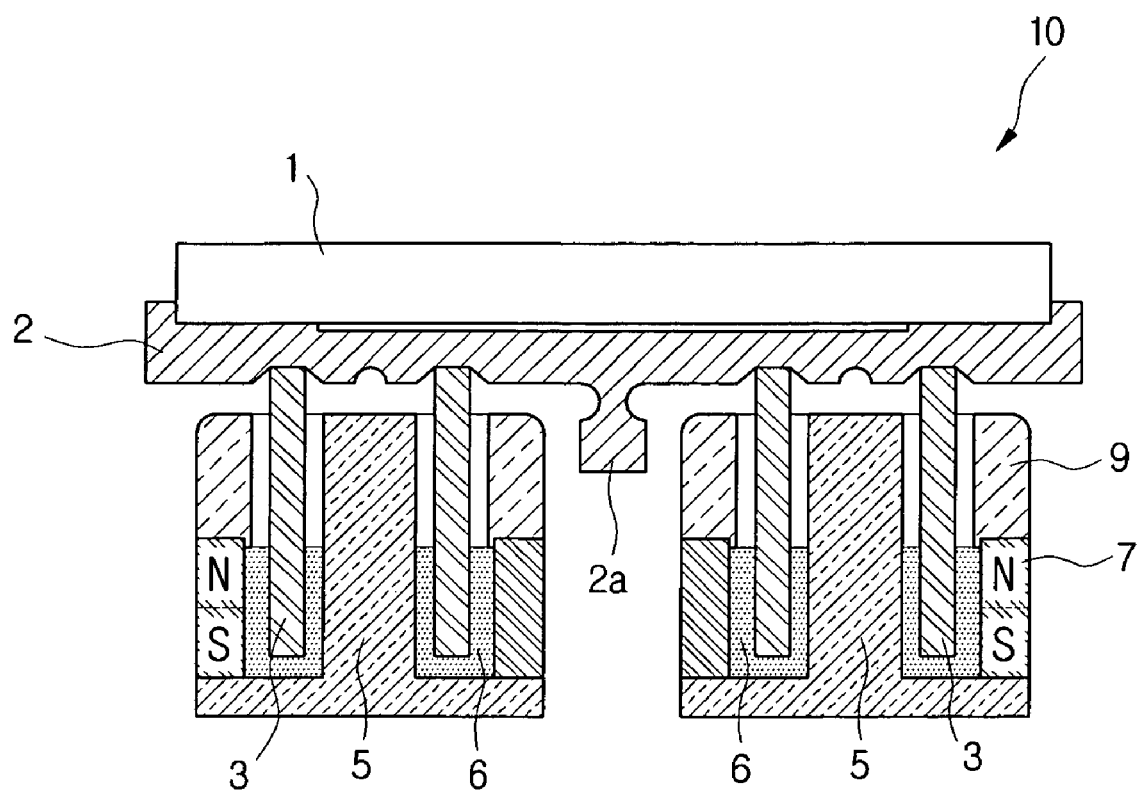
FIG. 2 is a cross-sectional view of a conventional vibration type tilting device.
Figure 3:
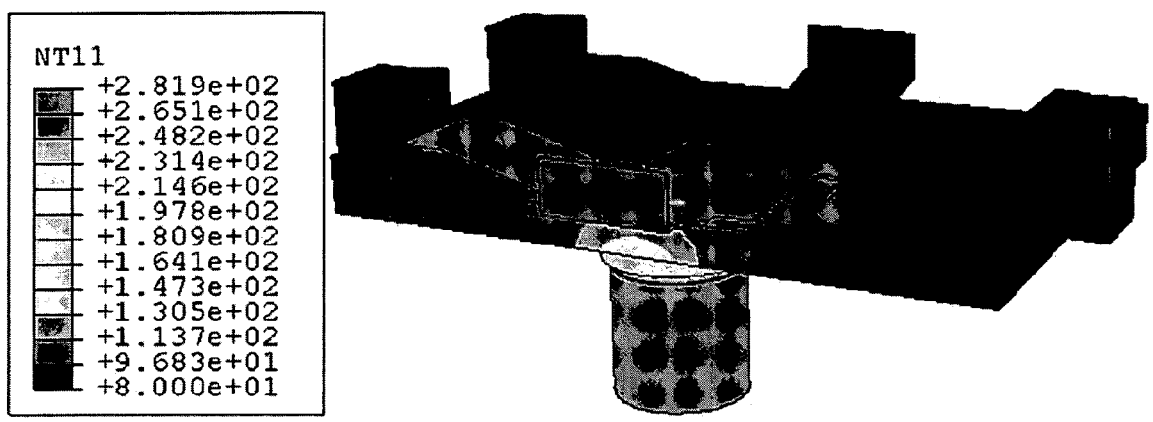
FIG. 3 is a graph representing the temperatures of the mirror holder and coils during operation of a conventional vibration type tilting device.
Figure 4A:
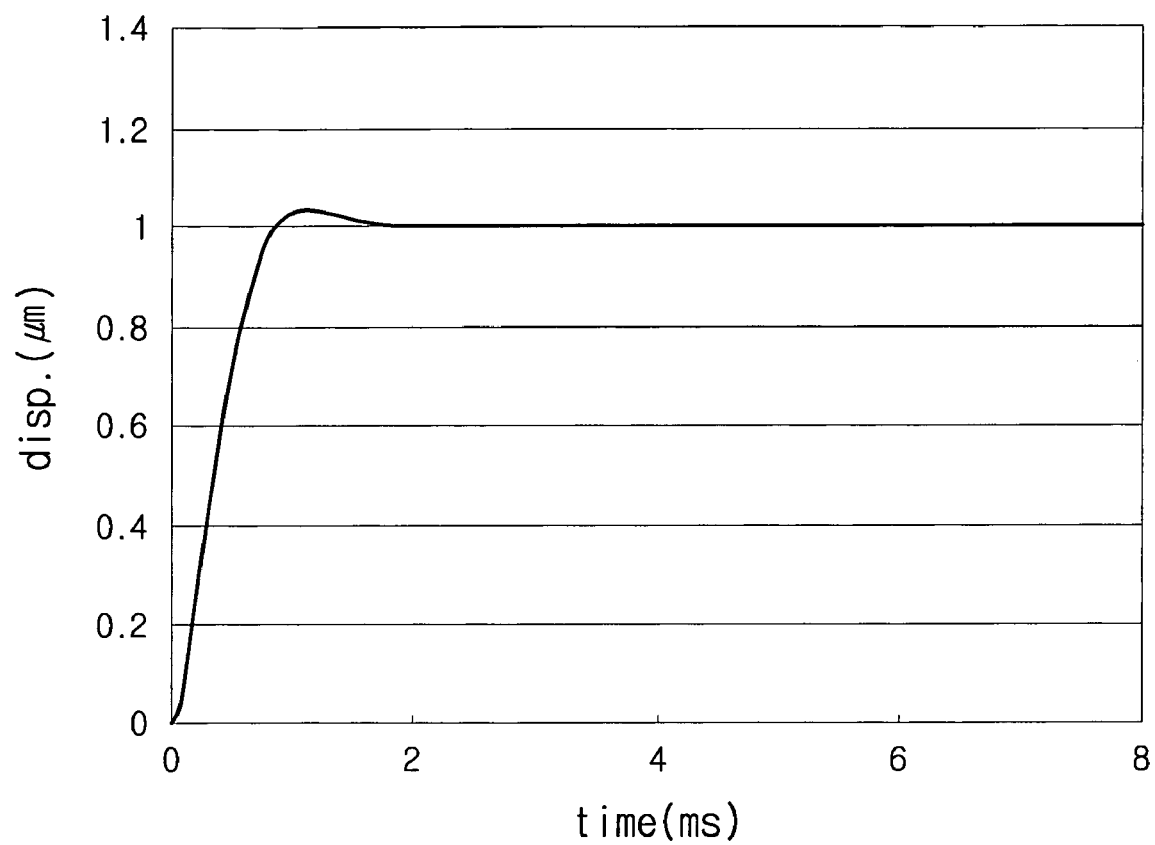
FIG. 4(a) is a graph representing the vibration characteristics of a tilting device at normal temperature.
Figure 4B:
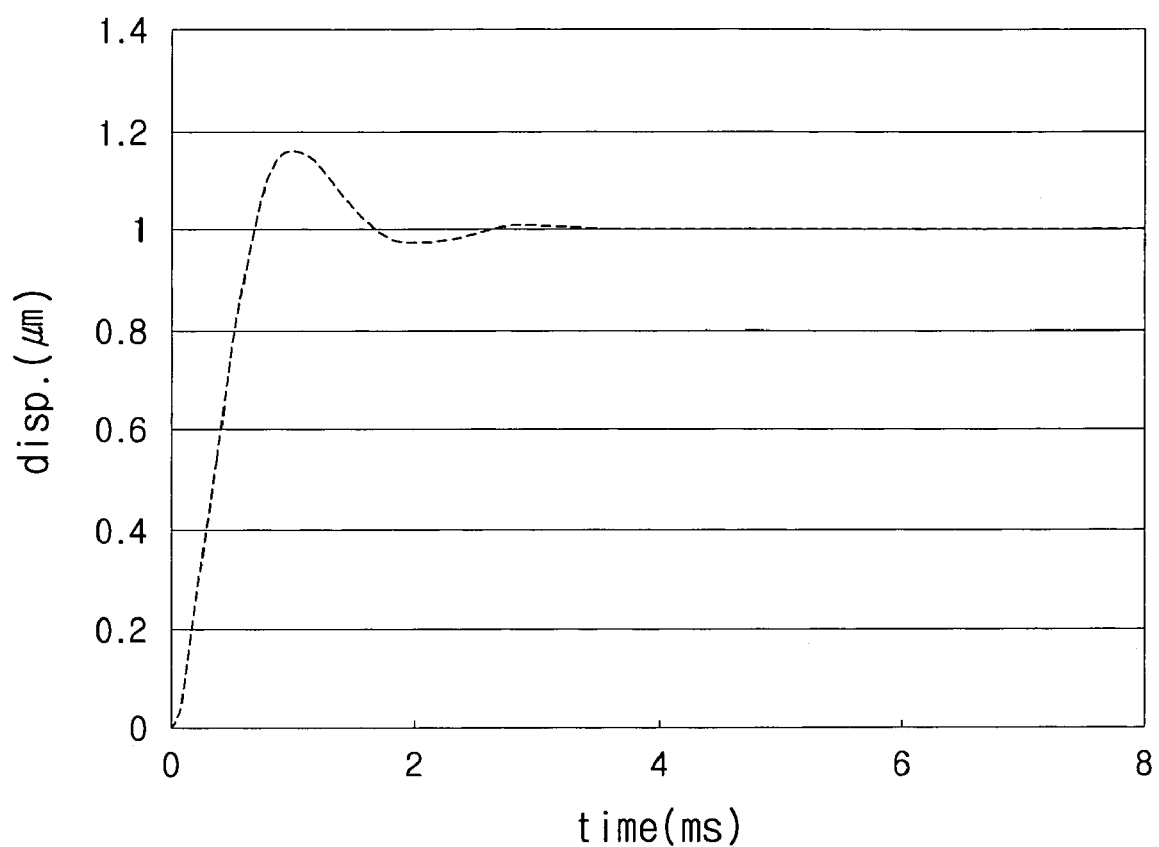
FIG. 4(b) is a graph representing the vibration characteristics of a tilting device kept for 1 hour at 80° C.

As seen in FIGS. 10(a) and 10(b), a vibration type tilting device according to an embodiment of the invention shows a 4.3% overshoot at room temperature, and a 9.7% overshoot after 1 hour at 80° C. Thus, even when the coil is at a high temperature due to prolonged use of the tilting device, the temperature of the viscous fluid is not increased, so that the overshoot is not increased greatly. Whereas the conventional vibration type tilting device, as illustrated in FIG. 4(b), shows an overshoot of 17.3% after 1 hour at 80° C., the device based on the present invention shows 9.7%, to reveal that the overshoot is not increased greatly.

Thus, with embodiments of the present invention, the overshoot of the mirror holder 30 can be reduced, so that the vibration performance of the tilting device can be improved, to provide a smoother and clearer picture quality.

As described above, the present invention can provide a vibration type tilting device which can improve vibration performance to provide a smoother and more natural picture quality.

While the above description has pointed out novel features of the invention as applied to various embodiments, it shall be understood that various changes and modifications are included within the scope of the invention, as long as they are implementations of the spirit of the invention.

What is claimed is:

1. A vibration type tilting device, comprising:
   a mirror holder supporting a mirror on one side and tilting together with the mirror such that the mirror periodically tilts light on a light path in a minute angle;
   a holder support part to support the other side of the mirror holder;
   a driving part to supply driving power to the mirror holder;
   a fluid insertion groove formed on any one of the mirror holder and the holder support part;
   a protrusion part formed on the other of the mirror holder and the holder support part and held in the fluid insertion groove; and
   viscous fluid placed between the fluid insertion groove and the protrusion part.

2. The vibration type tilting device of claim 1, wherein the fluid insertion groove and the protrusion part are separated by a particular gap from the driving part.

3. The vibration type tilting device of claim 1, wherein the protrusion part is arranged in bilateral symmetry with respect to the vibration direction of the mirror holder.

4. The vibration type tilting device of claim 1, wherein the driving part comprises:
   a coil joined to the bottom surface of the mirror holder; and
   a magnet, secured to the holder support part, generate a magnetic field passing through the coil.

5. The vibration type tilting device of claim 4, wherein the driving part further comprises a core, in contact with the magnet, having a portion thereof positioned inside the coil.

6. The vibration type tilting device of claim 5, wherein the driving part further comprises a yoke positioned on the magnet and surrounding an exterior of the coil.

7. The vibration type tilting device of claim 1, wherein the mirror holder comprises:

an incision part having a predetermined size; and a vibration arm formed in the incision part and supporting the mirror holder to allow vibration, wherein the vibration arm is joined to the holder support part.

8. The vibration type tilting device of claim 7, wherein the vibration arm has the shape of a "T" and has one or more arm securing holes on either end thereof, and the holder support part has one or more support part securing grooves formed in positions corresponding to the arm securing holes.

9. The vibration type tilting device of claim 1, wherein the viscous fluid is selected from a group consisting of grease, glycerin, UV-setting silicone, castor oil, SAE 30 oil, SAE 10W-30 oil, and SAE 10W oil.

* * * * *

UNITED STATES PATENT AND TRADEMARK OFFICE
CERTIFICATE OF CORRECTION

PATENT NO. : 7,457,022 B2  
APPLICATION NO. : 11/514306  
DATED : November 25, 2008  
INVENTOR(S) : Yang-Ho Moon et al.

Page 1 of 1

It is certified that error appears in the above-identified patent and that said Letters Patent is hereby corrected as shown below:

Column 6, Line 58, before "generate" insert --to--.

Signed and Sealed this

Tenth Day of March, 2009

JOHN DOLL  
*Acting Director of the United States Patent and Trademark Office*